Dec. 11, 1956 C. W. BERTHIEZ 2,773,430
TOOL ELEVATOR FOR MACHINE TOOL
Filed Dec. 5, 1951 9 Sheets-Sheet 1

INVENTOR
Charles William Berthiez
By George Hadley
ATTORNEY

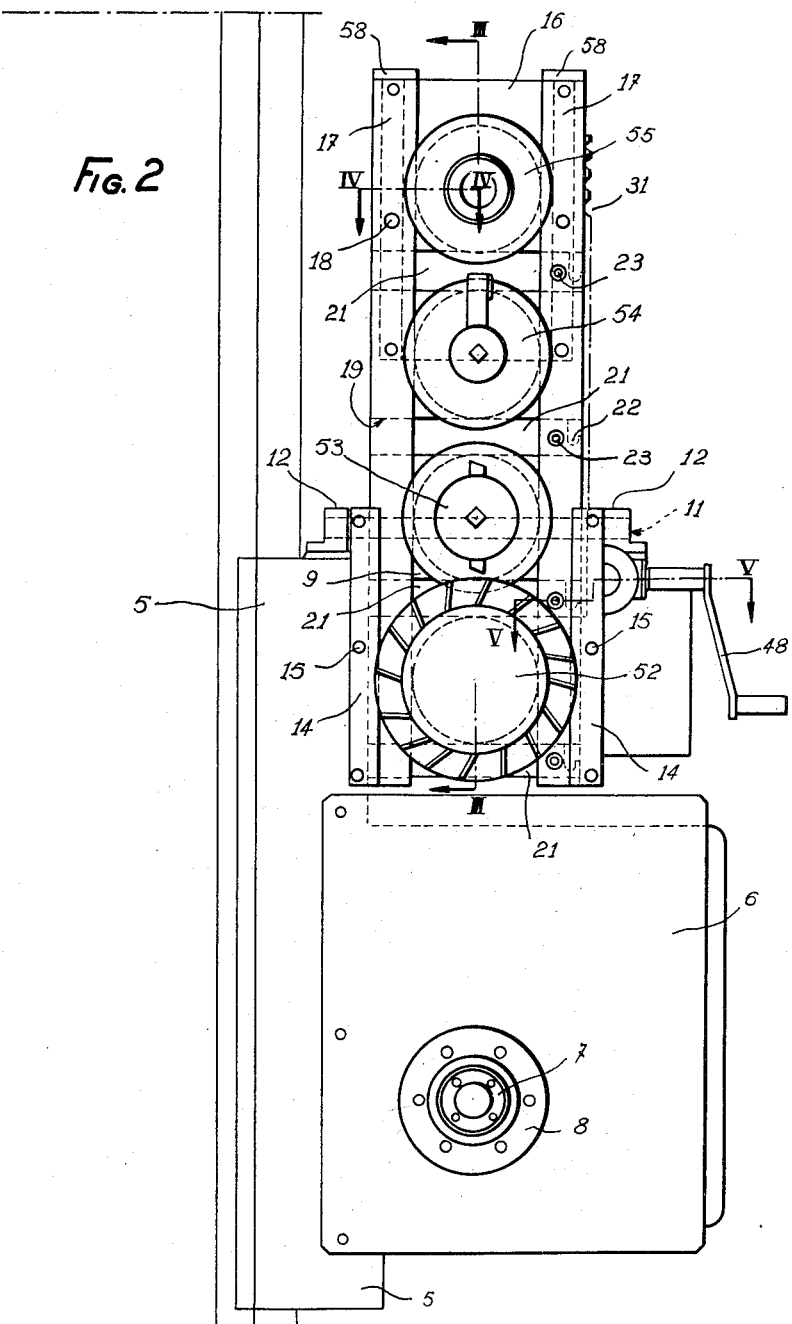

Dec. 11, 1956         C. W. BERTHIEZ         2,773,430
              TOOL ELEVATOR FOR MACHINE TOOL
Filed Dec. 5, 1951                    9 Sheets-Sheet 3
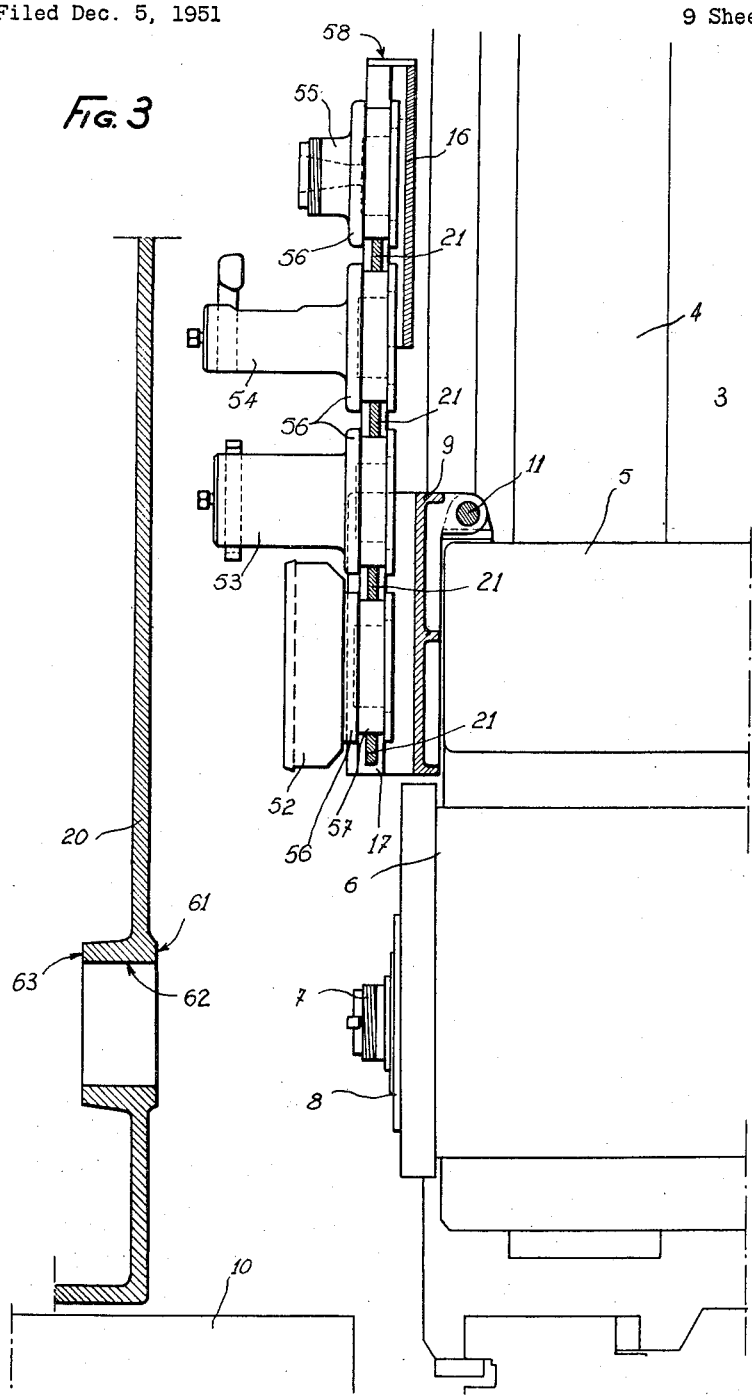
INVENTOR
Charles William Berthiez
By George H. Cooley
        ATTORNEY Dec. 11, 1956 C. W. BERTHIEZ 2,773,430
TOOL ELEVATOR FOR MACHINE TOOL
Filed Dec. 5, 1951 9 Sheets-Sheet 4
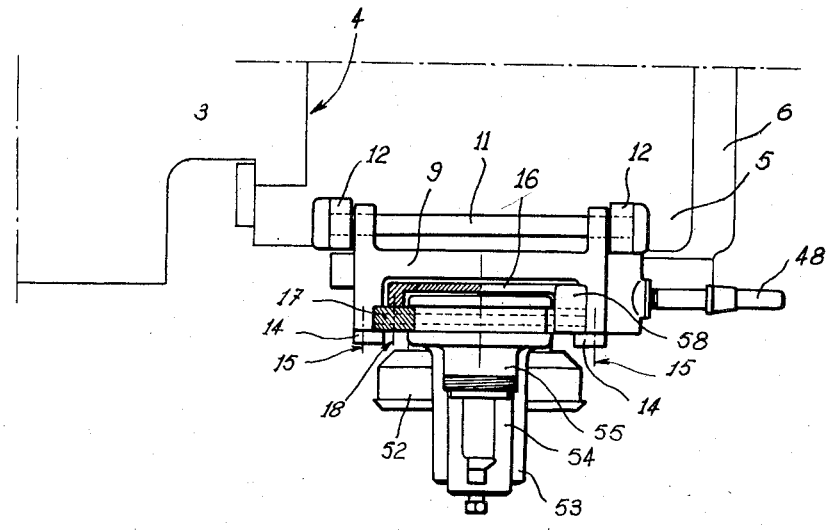
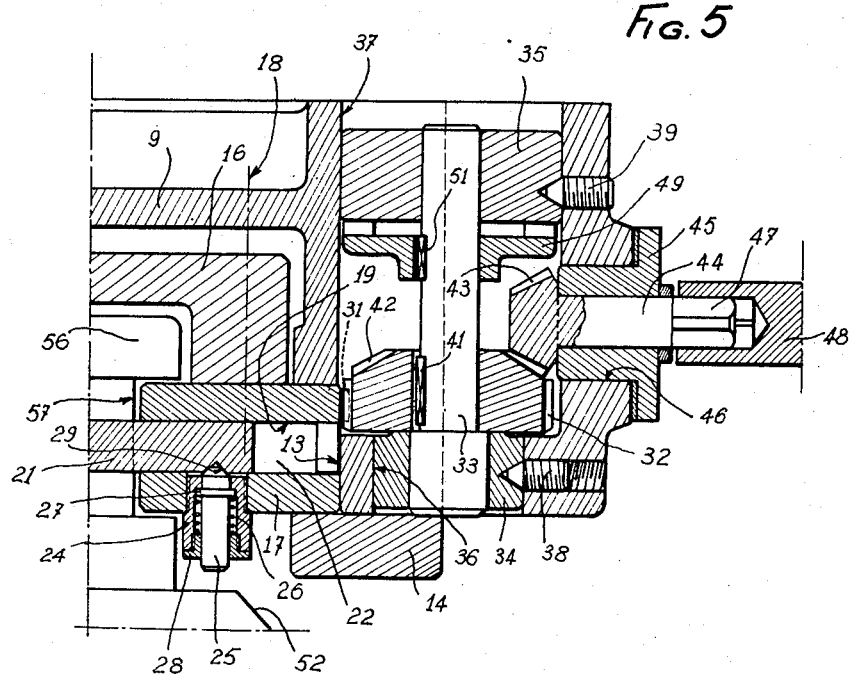
INVENTOR
Charles William Berthiez
By George Heesly
ATTORNEY.

Dec. 11, 1956  C. W. BERTHIEZ  2,773,430
TOOL ELEVATOR FOR MACHINE TOOL
Filed Dec. 5, 1951  9 Sheets-Sheet 5
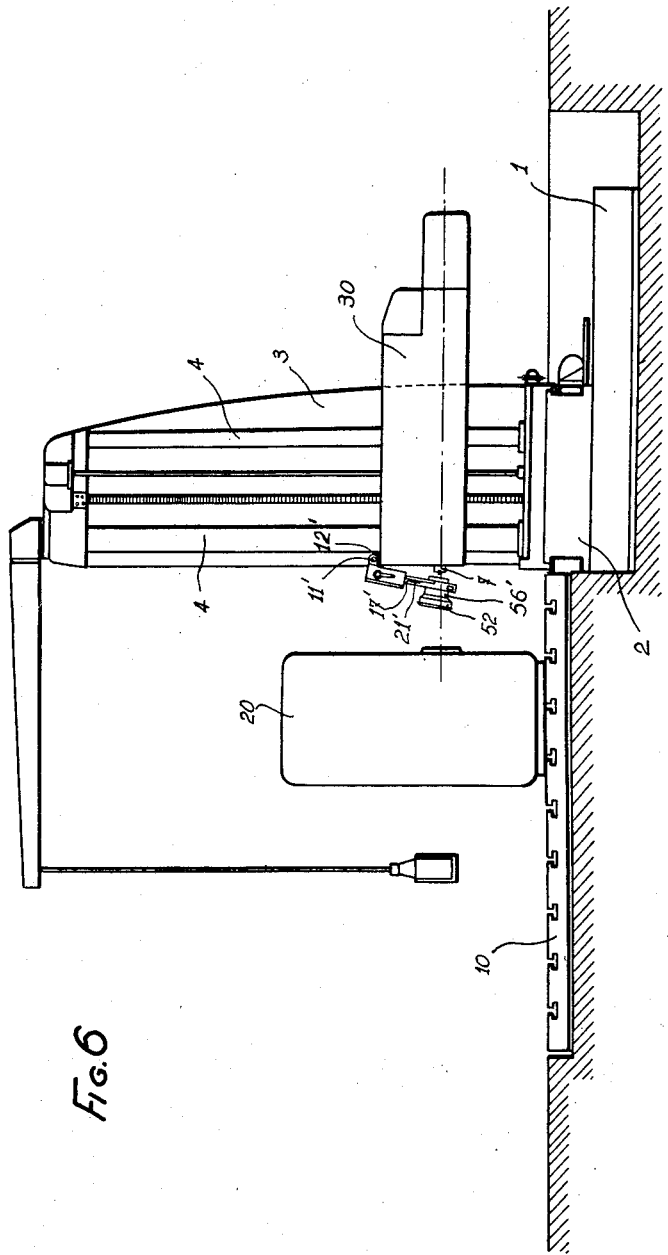
INVENTOR
Charles.William Berthiez
By
George H Corey
ATTORNEY Dec. 11, 1956   C. W. BERTHIEZ   2,773,430
TOOL ELEVATOR FOR MACHINE TOOL
Filed Dec. 5, 1951   9 Sheets-Sheet 6
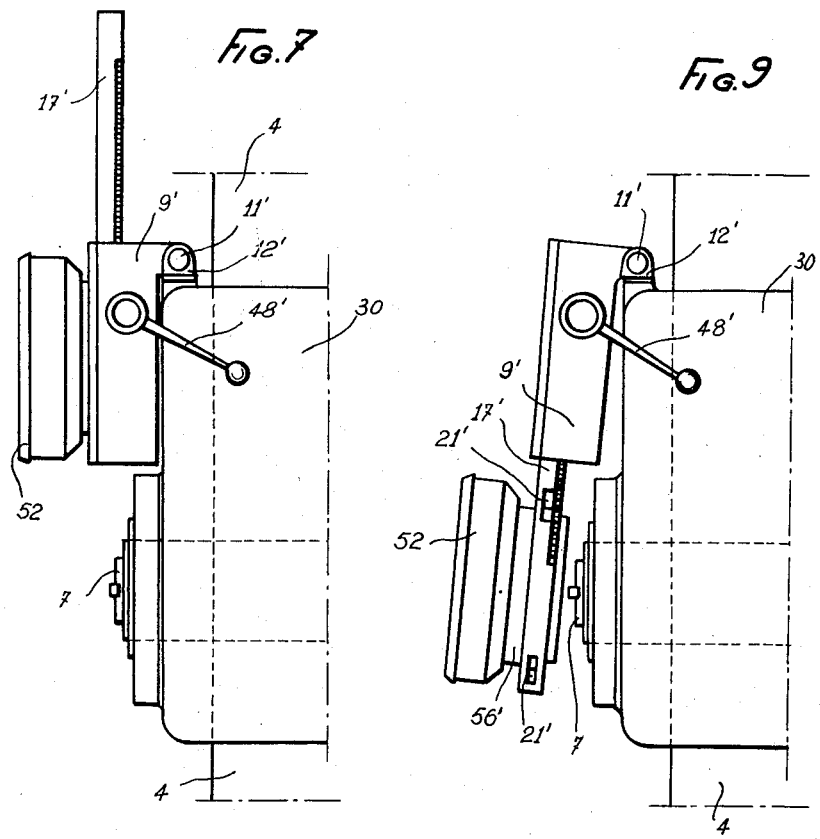
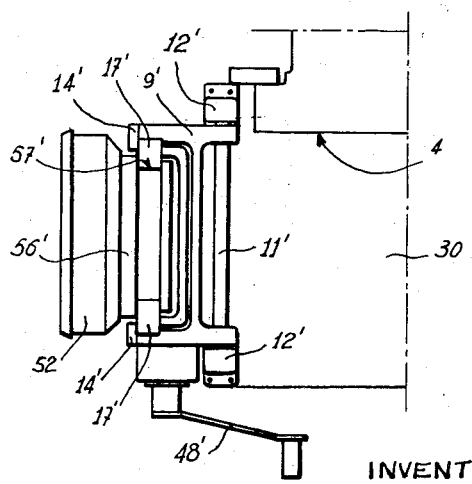
INVENTOR
Charles William Berthiez
By George H. Carey
ATTORNEY Dec. 11, 1956 C. W. BERTHIEZ 2,773,430
TOOL ELEVATOR FOR MACHINE TOOL
Filed Dec. 5, 1951 9 Sheets-Sheet 7

INVENTOR
Charles William Berthiez
By George H. Corley
ATTORNEY

Dec. 11, 1956 C. W. BERTHIEZ 2,773,430
TOOL ELEVATOR FOR MACHINE TOOL
Filed Dec. 5, 1951 9 Sheets-Sheet 8

INVENTOR
Charles William Berthiez
By
George H Cooley
ATTORNEY

Dec. 11, 1956  C. W. BERTHIEZ  2,773,430
TOOL ELEVATOR FOR MACHINE TOOL
Filed Dec. 5, 1951  9 Sheets-Sheet 9
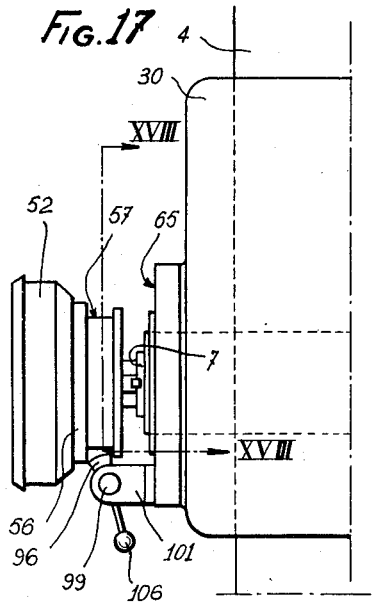
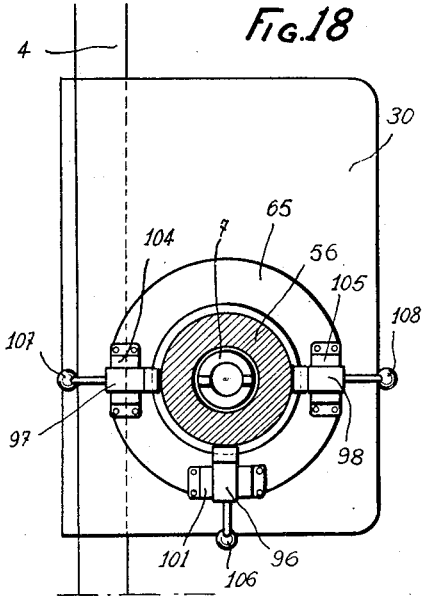
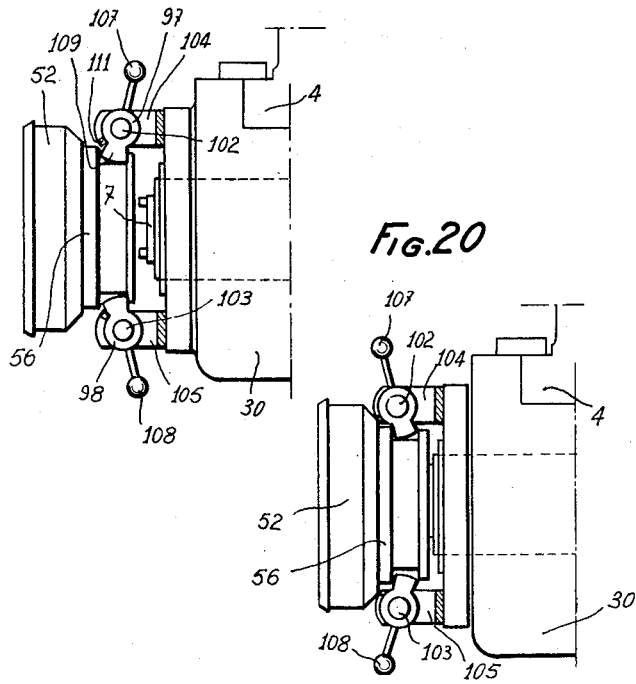
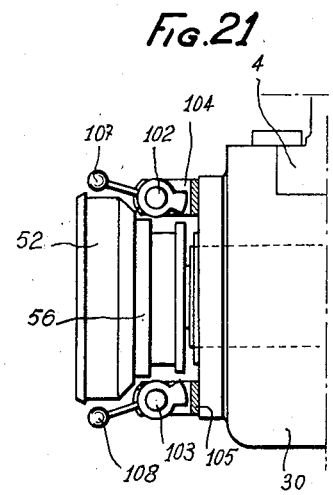
INVENTOR
Charles William Berthiez
By George H. Cooley
ATTORNEY

United States Patent Office 2,773,430
Patented Dec. 11, 1956

2,773,430

TOOL ELEVATOR FOR MACHINE TOOL

Charles William Berthiez, Bizy Vernon, France, assignor to Societe Nouvelle de Construction de Machines-Outils et d'Outillage Procedes C. W. B., Paris, France, a societe anonyme Application December 5, 1951, Serial No. 260,075

Claims priority, application France January 4, 1951

8 Claims. (Cl. 90—11)

The present invention relates to improvements in machine-tools with horizontal spindles, such as milling and boring machines, with a view to facilitating the mounting on the machine spindle of various tool equipments such as, for instance: milling cutters, tool-carriers and holders.

It is generally difficult to remove from and to fit tools on the machine spindle owing to the fact that the milling cutters, tool carriers or holders to be used, are themselves rather heavy. If the operator finds it awkward to hold such tools while removing them from the spindle, it is still more difficult for him, when he has to put them in place, to engage them correctly on their centering shoulder and, at the same time, to attach them. In fact, this operation is all the more difficult if the machine is a very accurate one, because in such a case, no allowance is made for clearance.

The object of the invention is a device intended to overcome such inconvenience by affording the operator the means of holding the tools during the mounting or removing, so that the operator can conveniently tighten or loosen the parts connecting the said tools to the spindle. Moreover, this device automatically holds the tools in place in the spindle axis, so that they are correctly centered with respect to the spindle and can be engaged straightway on the spindle, thus they can be mounted in the shortest possible time.

According to the invention, the machine-tool comprises a device for mounting tools on the spindle, this device being provided with retractable supporting and guiding parts adapted to occupy a service position in which they maintain the tools substantially in the spindle axis, and an idle position in which they are retracted, i. e. shifted away from the spindle axis; this device is mounted on a machine member carrying the spindle on the side thereof adjacent the end of the spindle on which the tools are to be fitted, whereas the said tools are provided with at least one guiding portion adapted to cooperate with the supporting and guiding parts of the above mentioned mounting device.

Preferably, the tool guiding portion consists in a circular groove cut into the base of the said tools.

According to another feature of the invention, the supporting and guiding parts consist in two inclined guiding supports which are arranged on each side of the vertical plane passing through the spindle axis and which, in their service position, are in engagement with the tool groove and support said tool.

According to another feature of the invention, the supporting and guiding elements consist in a lower support and two vertical lateral guides, the interspace of which is equal to the diameter of the tool groove.

According to a further feature of the invention, the retractable lateral guides and lower support form a frame adapted to slide in a substantially vertical direction, the lower support being preferably a bar adapted to slide in the lower ends of the two lateral guides.

According to another feature of the invention, the above mentioned frame slide is provided with one element of a horizontal hinge, the axis of which is at a right angle with respect to the spindle axis, the other element being secured to the machine member carrying the spindle.

According to a further feature of the invention, the above mentioned frame comprises other sliding horizontal bars arranged above the lower bar, the space between two adjacent horizontal bars being at least equal to the space between the lateral guides, so that a tool can be enclosed in each one of the spacings between two consecutive bars.

Other features of the invention will be apparent from the following description and from the accompanying drawings given only by way of example and in which:

Fig. 2 is a fragmental front view corresponding to Fig. 1, but on a larger scale, and showing in a more detailed manner the tool-mounting device itself;

Fig. 3 is a section along line III—III of Fig. 2 of the mounting device, the visible parts of the milling and boring machine, as well as the tools themselves, being shown in elevation;

Fig. 4 is, in its left part, a semi-section along the line IV—IV of Fig. 2, and in the part to the right, the corresponding top view;

Fig. 5 is a section view, on a larger scale, along line V—V of Fig. 2;

Fig. 6 is a side view, on a small scale, of a second embodiment of the improvement according to the invention and fitted to a milling and boring machine slightly different from the type of machine shown in Fig. 1;

Figs. 7 and 8 show, on a larger scale, respectively, fragmentary side and top views corresponding to Fig. 6 and showing in a more detailed manner the tool mounting device generally represented in Fig. 6;

Fig. 9 is another elevational view similar to Fig. 7, but with the members differently positioned;

Figs. 17, 18 and 19 are, respectively, side, front (the tool being cut along line XVIII—XVIII of Fig. 17) and top views of another variation again for the same type of machine; and Figs. 20 and 21 are two further top views similar to Fig. 19, but showing the device members, as well as the tools in different positions.

Figure 1:
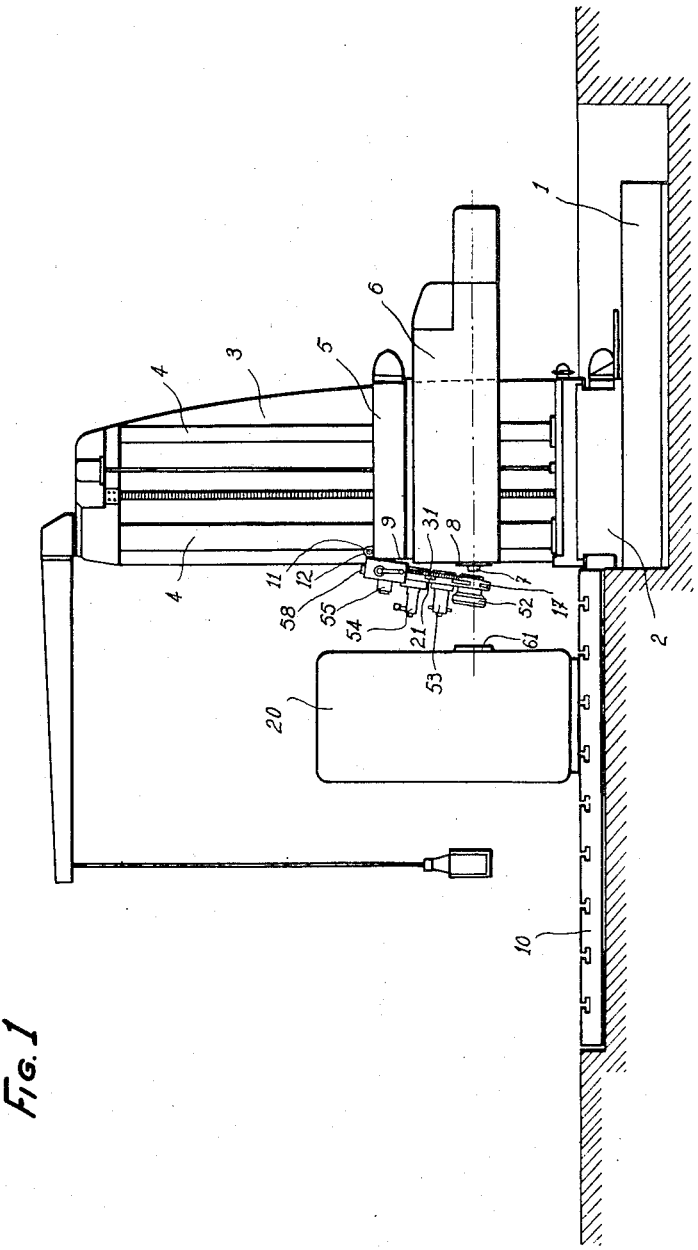
Fig. 1 is a side view, on a small scale, of a first embodiment of a device for the quick mounting of tools, according to the invention, and showing the general disposition of said device on a milling and boring machine of the floor type.
Figure 10:
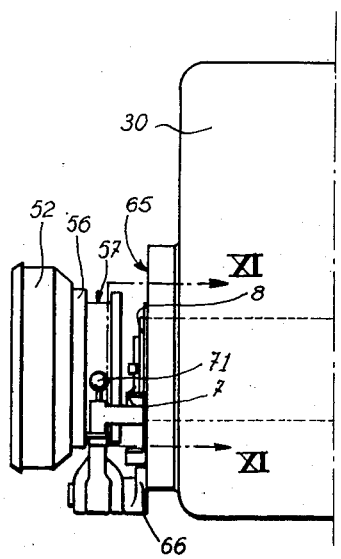
Figs. 10, 11 and 12 are, respectively, fragmentary side, top, front (the tool being cut along line XI—XI of Fig. 10) views of a third embodiment of the invention.

Fig. 1 shows by way of example a milling and boring machine provided with a floor plate comprising horizontal runways 1 on which can move a bed 2, the general direction of which is perpendicular to that of the runways 1. The bed 2 supports a column 3 which can slide along said bed. The column 3 is provided with vertical runways 4 on which can move a slide 5 provided with horizontal runways (not visible in the drawing) in which can slide a milling and boring headstock 6 (see also Figs. 2 and 3) fitted with a first spindle 7 to which a rotational and a longitudinal translational motion can be imparted, and a second spindle 8 surrounding the first spindle but adapted only to rotate. The workpiece 20 is placed on the floor-plate 10 of the machine.

It is desired to perform successively on this workpiece a given number of machining operations requiring, for instance, the use of a large surfacing cutter and of various tool carriers to be mounted on the end of the spindle 8.

To mount the said tools on the spindle 8 and to remove them therefrom, a rapid mounting device according to the invention will be used, the detailed description of which will be made by referring more particularly to Figs. 2 to 5. This device, described here by way of example, is carried by the headstock slide 5. As shown on a larger scale in Figs. 2, 3 and 4, it comprises a support 9 mounted on the headstock slide 5 by means of an horizontal hinge 11 secured in two lugs 12 rigid with the upper face of the headstock slide 5. The support 9 is provided with slideways, each formed by a groove 13, and a flange 14 secured to the support 9 by screws 15 (Fig. 2) shown in Fig. 4 only by their axes. In these slideways 13 can slide a frame comprising a body 16 to which are secured two side members 17 by means of screws 18 (Fig. 2) shown in Figs. 4 and 5 merely by their axes.

Both side members 17 of the frame are provided with rectangular mortises 19 (Fig. 2) cut through the side members 17 and in which can slide rectangular bars 21 of a corresponding shape. These bars do not protrude out of the frame side members 17 so as not to hamper the vertical sliding motion of the frame in its support 9. Notches 22 have been provided in the bars 21 near their ends to enable the operator to take them out of the frame by placing a finger in the mortises 19.

In order to ensure the correct position of the bars when they are in the frame, positioning devices 23 in register with each bar, are provided in one of the frame side members. These positioning devices can be designed, for instance, in the same manner as that represented in Fig. 5 of the drawing, that is to say, they can consist in a small cylindrical hollow body 24 screwed in side member 17 level with one of the bars 21 and in which can slide a pointed bolt 25 urged towards the bar by a compression spring 26 bearing, on the one hand, on a shoulder 27 of the bolt, and, on the other hand, on a cover 28 screwed in the body 24 and having an axial bore to act as a guide for the bolt. The bar 21 is provided with a conical recess 29 which is in register with the bolt when the bar is in place. In this way, the end of the bolt can be engaged in the conical recess of the bar and prevent the said bar from unexpectedly coming out.

In order to allow the frame 16 to move up and down in its support 9, one of the side members 17 is provided with a rack 31 in mesh with a pinion 32 (Fig. 5) which is mounted on a shaft 33 itself held in two bushings 34 and 35 housed respectively in bores 36 and 37 of the support 9. These two bushings are held in position by means of pointed screws 38 and 39 respectively. The pinion 32 is keyed on the shaft 33 by a key 41 and, on one of its faces, it is provided with a bevel toothing 42 in mesh with a corresponding bevel pinion 43 mounted on a shaft 44 pivoting in a bushing 45 fitted in a bore 46 of the support 9. The end of the shaft 44 is formed into a square portion intended to receive a crank 48 (see also Figs. 2 and 4). In order to prevent the frame from falling by virtue of its own weight, a classical ratchet gearing device 49 (not represented in detail) is provided and it is keyed on shaft 33 by means of a key 51, and cooperates with the stationary bushing 35.

In order to raise and lower the frame, any other non-overhauling device such as, for instance, a worm drive, can be provided in lieu of this driving device including bevel pinions and ratchet gearing.

The tools to be mounted on the milling and boring spindle 8 are so arranged as to be held in the frame 16, 17. For this purpose, these tools (for instance: the surfacing milling cutter 52, the boring tool carrier 53, the surfacing tool carrier 54, the boring bar holder 55) all include a base 56 provided with a circular groove 57, the diameter of which is substantially equal to the space between the two side members 17, and the width of which is substantially equal to the thickness of these side members. The space between two consecutive frame bars is also equal to the diameter of said circular groove, so that it is possible to enclose one of the tools in each one of the spaces between two consecutive bars.

The upper portion of the frame is formed with a stop 58 intended to bear against the upper portion of the support 9 when the frame is lowered to the end of its travel. At this stage, the arrangement is such that the tool 52 resting on the lowermost frame bar 21 is in the axis of the machine spindle 8. In order to allow for the level of the tool equipment to be accurately adjusted, the upper edge of the lower bar is slightly inclined with reference to the horizontal, so that by slightly shifting the bar in a longitudinal direction, the tool resting on it can be raised or lowered to a small extent.

The operation of the quick mounting device just described is very simple. For instance, it will be assumed that three successive machining operations are to be performed on the workpiece 20, namely: facing the outer surface of the boss 61 (see Fig. 3), machining a bore 62 and facing the inner face of the boss 63. Preferably, the frame is first brought to the end of its downward travel, if it is not already there, by means of the crank 48 with the stop 58 bearing on support 9 (position shown in Fig. 1). Then the surfacing cutter 52 is mounted in the frame, on the lower bar; the boring tool carrier 53 is mounted on the next bar and, finally, the surfacing tool carrier 54 is mounted on the next bar. At this stage, the cutter 52 is in the axis of the spindle 8 on which the said cutter is to be mounted. It will be noted that the support 9 is pivoted about the horizontal hinge 11 in order to allow the cutter to be engaged on its centering shoulder by causing the frame to pivot slightly about the said hinge. This pivotal movement causes the cutter to move a little in a direction substantially horizontal, inasmuch as the curvature radius of this movement is very long with respect to the travel which merely corresponds to the thickness of the centering shoulder of the cutter on the spindle 8. As stated above, it is possible to maintain the cutter strictly level with the axis of the spindle by adjusting longitudinally the lower bar, the upper edge of which is slightly inclined. Once the cutter is engaged on its bar and held in the frame, it is very easy to mount the screws to secure the said cutter on the spindle. Thereafter, the lowermost bar is pulled out by inserting a finger in the notch 22 and the frame is raised to its upper position by means of the crank 48, and the lowermost bar is again put in place. This clears completely the cutter carrying headstock which can, without inconvenience, be brought near to the workpiece in order to perform the desired machining operations. It will be noted that if the headstock were brought forward before the frame is raised, no accident would happen owing to the presence of the horizontal hinge 11 by means of which the operator would be able to notice at once that the frame is being pushed by the headstock because he has omitted to raise the frame.

When the milling operation is completed and it is desired to work with the second tool, that is to say with the boring tool carrier 53, the first thing to be done is to remove the cutter 52 from the spindle 8. To do this conveniently, the frame is again lowered, the lowermost bar 21 is removed and the two frame side members 17 are engaged on each side in the cutter groove 57. When the frame has reached the end of its downward travel, the lowermost bar 21 is put back in place and it then engages the circular groove 57 of cutter 52. The cutter is now enclosed in the frame 9 and it is possible for the operator to safely remove it from the spindle 8 by pulling it away from the spindle so that the frame 9 moves together with the cutter and pivots slightly about its hinge 11. The lowermost bar 21 is then removed, the cutter 52 is taken out of the frame from the bottom part thereof and this lowermost bar is put back into place. In order to mount the tool carrier 53 on the spindle, the bar 21 supporting this tool is taken away, the tool 53 is lowered till it comes to rest on the lowermost bar and the second bar is put back into place. This movement of the tool 53 is effected by sliding it with the side members 17 of frame 16 engaged in the circular groove 57 of the tool 53. The tool carrier 53 is now level with the axis of the spindle, and it will be mounted thereon in the same way as described for the cutter 52. When the boring operation is completed, the tool carrier 53 is removed with the help of the frame in the same manner as for the cutter 52. The tool carrier 54 to be used for the third machining operation is brought on to the lowermost frame bar 21 and is mounted and removed in the same way as for the previous tools.

The drawing shows a fourth tool which is the holder 55 intended to secure and drive a boring bar which could be used to perform a further machining operation on the workpiece 20.

The tools represented have been selected by way of examples only, and various other tools can be used according to the kind of work to be done, provided always that they have a base 56 in which a groove 57 is cut, in accordance with the above description.

The drawing shows a frame adapted to carry four tools, but it is obvious that it would not be beyond the scope of the invention to provide the frame with any number of tools, for instance, with only one tool. In the latter case, the tools would be mounted one after the other in the frame which again would act as a support when mounting the tools on the spindle and removing them from the spindle.

Fig. 6 shows as an example a floor-type milling and boring machine somewhat different from that of Fig. 1, the difference consisting in the fact that the headstock 30, instead of being mounted in horizontal runways carried by a slide 5 of Fig. 1 which is vertically movable along the column 3, is, in the present case, movable only vertically along said column. This headstock is provided with a spindle 7 to which can be imparted a rotational motion, as well as a longitudinal translational motion.

Figs. 7 to 9 show a device which is very similar to that shown in Figs. 1 to 5 but which differs in that the sliding support instead of being mounted on the slide on which the headstock could be shifted horizontally, is mounted on the headstock itself. This embodiment could be applied to milling and boring machines of the same type as that represented in Fig. 1; however, it is designed especially for machines which have no headstock-carrying slide, that is to say for machines such as that represented in Fig. 6, the headstock of which slides vertically along the column without any intermediary support. The frame in the embodiment shown in the drawing, is designed to receive one tool only, for instance the cutter 52, but it could just as well be designed to receive several tools, as in the case with the device shown in Figs. 1 to 5. To designate the various elements of the device shown in Figs. 7 to 9, the reference numbers of the corresponding elements of the device shown in Figs. 1 to 5 have been adopted with the addition of prime mark (′) so as to differentiate them. It is obvious that the way of using the two devices is the same and, therefore, it is unnecessary to describe it once more. The only difference is that the tool (cutter 52 for instance) is mounted on the spindle 7 instead of being mounted on an outer spindle 8 which usually does not exist in a machine such as the one represented in Fig. 6.

Figure 11:
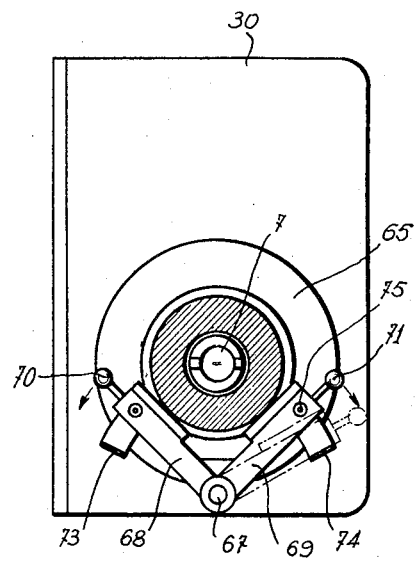
Figure 12:
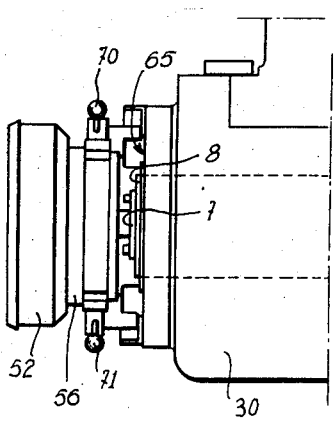
Figure 13:
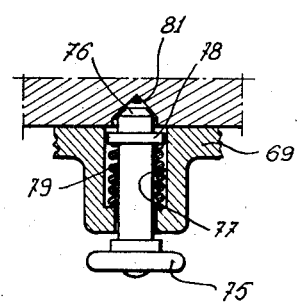
Fig. 13 is a section, on a larger scale, of a locking device used in the embodiment shown in Figs. 10, 11 and 12.

Figs. 10 to 13 show another embodiment of a device according to the invention designed to rapidly mount the cutter on the spindle 7. In said embodiment, the trued portion 65 of the face of the boring and milling headstock 30 is provided with a support 66 in which is mounted a shaft 67 acting as fulcrum for two levers 68 and 69 provided with operating handles 70 and 71 respectively. These levers can occupy two positions, namely a working position, which is that represented by full lines in the drawing, and a neutral position which is represented by dash and dot lines in the left portion of Fig. 11 and in which the two levers rest on two stops 73 and 74 respectively. The levers 68, 69 are held in service position by means of a lock which can be designed, for example, as represented in detail in Fig. 13, and the operation knob 75 of which is seen in Fig. 11. This lock consists in a pointed bolt 76 housed in a bore 77 of lever 69 and provided with a shoulder 78 against which bears one end of a compression spring 79, the other end of this compression spring bearing on the bottom of the bore 77. The operating knob 75 is used to pull the pointed bolt 76 so as to release its point from a conical recess 81 shaped accordingly and which is provided on the trued portion 65 of the face of headstock 30.

The cutter 52 to be mounted on the spindle has a body 56 provided with a circular groove 57, the width of which is substantially equal to the thickness of the levers 68, 69. The relative position of the various elements of this device is such that if the cutter 52 is made to rest on the two levers 68 and 69 when they are in the service position, so that the cutter groove 57 engages these two levers, the cutter is exactly in the axis of the machine spindle 7.

The operation of the quick mounting device just described is self-explanatory. In order to mount the cutter 52 on the spindle 7, it is sufficient to bring the levers 68, 69 into their service position, then to place the cutter on these levers in such a way as to have the circular groove 57 engaged between said levers, as explained above. The cutter is thus maintained in the axis of the spindle 7. The spindle, preferably by hand, then is moved to project a little way in order that it may be engaged in the cutter bore and the screws are inserted to secure the cutter on the spindle. The two levers 68, 69 are released by oscillating them downwards about their shaft 67 after having disengaged the pointed bolt locking them in their service position. These two levers now rest upon their respective stops 73 and 74, and it is then possible to longitudinally shift at will the spindle together with the cutter 52 in order to perform the desired machining operations. This device can also be used to remove the cutter from the spindle, in which case the above-mentioned procedure will be reversed.

For the description of this example of quick mounting, we have considered a surfacing cutter, but, when using the same device, it is, of course, possible to mount on the spindle any other tooling such as a boring tool-carrier, a surfacing tool carrier or any holder to support a boring bar, for instance.

Figure 14:
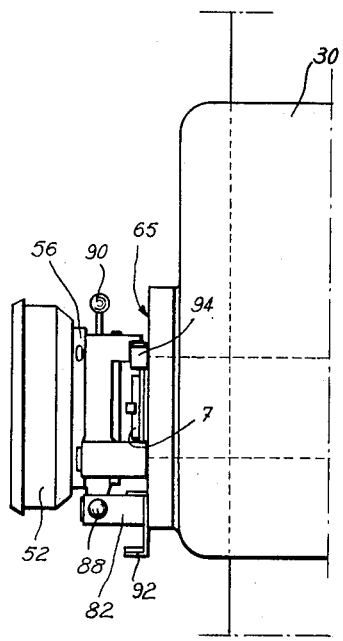
Figs. 14, 15 and 16 are, respectively, side, front and top views of a further embodiment of the invention designed for the machine represented in Fig. 6.
Figure 15:
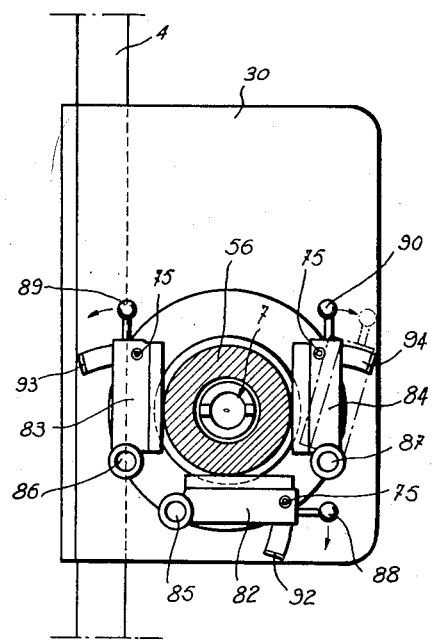
Figure 16:
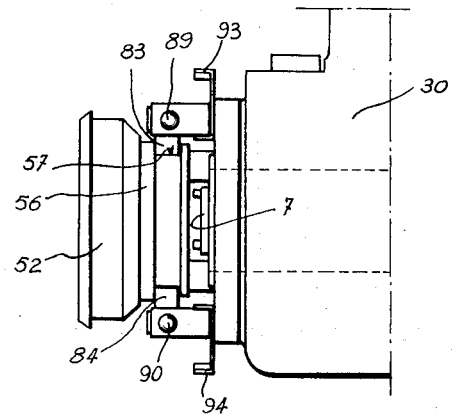

In Figs. 14 to 16 is shown a variation of the device just described. This other embodiment comprises, instead of two oscillating lever arranged in a V formation, a support 82 and two lateral guides 83 and 84 adapted pivotally to move about pins 85, 86 and 87 respectively mounted on the trued portion 65 of the face of headstock 30. This support and these two lateral guides thus constitute levers provided with operating handles 88, 89, 90 respectively and adapted to occupy either a service position, which is that represented in full lines in the drawing, or a retracted position in which they are located further away from the axis of the spindle 7 (position shown in dash and dot lines in Fig. 15 for lever 84) and rest on stops 92, 93, 94 respectively. Locks similar to that of Fig. 13, the operating knobs of which are shown in 75 in Fig. 15, are provided to lock these levers in their service position.

The operation of this device is entirely similar to that of the device previously described, namely: to mount the cutter 52, this cutter is slipped down between the lateral guides 83, 84 which are in their service position with the guides 83, 84 engaging groove 57 of the cutter, and is brought to bear on the support 82 which is also in its service position. The cutter is engaged upon axial movement of the spindle and is secured to the spindle 7 and then the three levers 82, 83, 84 are released and brought to rest on their respective stops 92, 93, 94. The same device can, of course, be used to remove the cutter 52 by reversing the procedure. Similarly, the cutter can be, of course, replaced by any other suitable tooling provided it has a body 56 with a circular groove 57.

Figs. 17 to 21 represent still another embodiment of quick mounting device according to the invention, which comprises a support 96 and two lateral guides 97 and 98 but, whereas in the previous embodiment the support and the lateral guides were made to pivot about an axis perpendicular to the face of the headstock 30, in the present embodiment they are made to oscillate about axes parallel to this face. Thus, the support 96 pivots about a horizontal pin 99 mounted in a yoke-piece 101 secured to the trued portion 65 of the headstock face, whereas the lateral guides 97 and 98 pivot about pins 102 and 103 respectively which are mounted in the yoke-pieces 104 and 105 secured to the headstock. The support 96 and the two lateral guides 97, 98 are provided with operating handles 106, 107, 108 respectively. The handle 106 of the support 96 is not indispensable, as will be seen further on. The lateral guides 97, 98 and the support 96 comprise a portion 109 (see particularly Fig. 19) in the shape of a cam the width of which is substantially equal to the width of the circular groove 57 of the cutter 52 and which, when the levers are in their working position, bears on a stop, such as stop 111 for the guide 97, this stop being rigid with the corresponding yoke-piece such as 104.

This device is operated as follows: For the mounting, the cutter 52 is engaged at the top of the frame between the lateral guides 97, 98 and brought to rest on the support 96 (Figs. 18 and 19) in such a way that the circular groove 57 engages the cams 109. The machine spindle 7 is moved axially so as to be adjacent the cutter body. Then by pulling the operating handles 107 and 108 of the two lateral guides 97, 98, the cutter 52 is made to engage the spindle 7 (see Fig. 20). The cutter is secured to the spindle and then the cams 109 are released from the cutter groove by bringing the levers 107, 108 in the neutral position represented in Fig. 21.

It is obvious that the device can be used also to remove the cutter.

The invention is, of course, not restricted to the embodiments described and represented, which have been given merely as examples. For instance, the devices of Figs. 7 to 21 have been described by referring to the milling and boring machine of Fig. 6 comprising no headstock-carrying slide, but it is obvious that they can be applied to a milling and boring machine provided with a headstock-carrying slide, such as the machine represented in Fig. 1. The tool-guiding system too, instead of consisting in a circular groove provided in the base of the tool and in guides engaging the said circular groove, could consist in an annular fillet or bead provided on the tool and a groove correspondingly shaped cut into the said guides.

What I claim is:

1. A device for transporting an object to be mounted on a supporting member from an inoperative position to an operative position with reference to an axis fixed with respect to said supporting member, said device comprising an element adapted to be mounted on said supporting member, a member carrying a linear trackway, means mounting said trackway member on said element so that said trackway extends transversely of said fixed axis and said trackway member has limited movement in the direction along said fixed axis, a carriage mounted on said trackway member for movement of said carriage along said trackway, means carried by said carriage for supporting said object on said carriage, and means operatively connected to said trackway member and to said carriage and operable for moving said carriage along said trackway between positions in which said object respectively is in said inoperative and said operative positions.

2. A device for transporting an object to be mounted on a supporting member from an inoperative position to an operative position with reference to an axis fixed with respect to said supporting member, said device comprising an element adapted to be mounted on said supporting member, a member carrying a rectilinear trackway, means mounting said trackway member on said element so that said trackway extends transversely of said fixed axis and said trackway member has limited movement in the direction along and in a plane parallel to said fixed axis, a frame mounted on said trackway member for movement of said frame along said trackway, said frame providing a rectilinear guideway extending parallel to said rectilinear trackway, said rectilinear guideway being capable of engaging said object to provide for movement of said object to different positions along said guideway of said frame, means carried by said frame for engaging said object for supporting said object on said frame in a given one of said positions of said object along said guideway to dispose said object for mounting in the position of said frame corresponding to said operative position, and kinematic means operatively connected to said frame and to said member and operable for moving said frame along said trackway between positions in which said object respectively is in said inoperative and said operative positions.

3. A device as defined in claim 2 in which said rectilinear guideway of said frame provides engagement with a peripheral groove extending about an axis of said object to dispose said object for said movement thereof along said guideway.

4. A device as defined in claim 2 in which said means carried by said frame for supporting said object on said frame comprises a bar supported in said frame and extending transversely of said rectilinear guideway for supporting said object in said frame for movement with said frame along said rectilinear trackway, said bar being movable relative to said frame between positions in engagement with and out of engagement with said object.

5. A device as defined in claim 4 in which said bar is movable lengthwise thereof relative to said frame, the edge of said bar engaging said object and extending transversely of said rectilinear guideway being slightly inclined to the direction perpendicular to said guideway to provide for adjustment of the position of said object with respect to said frame to adjust the position of said object for mounting on said fixed axis by movement of said bar lengthwise thereof transversely of said guideway.

6. A device as defined in claim 2 which comprises detent means operatively connected to said trackway member and to said frame to determine said inoperative and said operative positions of said frame on said trackway.

7. A device for transporting an object to be mounted on a supporting member from an inoperative position to an operative position with reference to an axis fixed with respect to said supporting member, said device comprising an element adapted to be mounted on said supporting member, a member carrying a linear trackway, means mounting said trackway member on said element so that said trackway extends transversely of said fixed axis and for pivotal movement of said trackway member in a plane parallel to said fixed axis on an axis extending transversely of and offset from said fixed axis, a carriage mounted on said trackway member for movement of said carriage along said trackway, means carried by said carriage for supporting said object on said carriage for movement along said trackway, and kinematic means operatively connected to said trackway member and to said carriage and operable for moving said carriage along said trackway between positions in which said object is in said inoperative and said operative positions.

8. A device as defined in claim 7 in which said pivotal axis of said trackway member extends horizontally in a plane perpendicular to said fixed axis, said fixed axis also being horizontal.

References Cited in the file of this patent

UNITED STATES PATENTS

| | | |
|---|---|---|
| 1,316,634 | Noffke | Sept. 23, 1919 |
| 1,940,910 | Hickey | Dec. 26, 1933 |
| 2,249,783 | Reggio | July 22, 1941 |
| 2,250,594 | Morton | July 29, 1941 |
| 2,314,792 | Korner | Mar. 23, 1943 |
| 2,315,393 | Bowerman | Mar. 30, 1943 |
| 2,369,280 | Carr | Feb. 13, 1945 |
| 2,509,950 | Zierke | May 30, 1950 |
| 2,540,451 | Kelley | Feb. 6, 1951 |
| 2,553,156 | Woodward | May 15, 1941 |
| 2,644,368 | Miller | July 7, 1953 |
| 2,685,122 | Berthiez | Aug. 3, 1954 |
| 2,685,823 | Kaiser | Aug. 10, 1954 |
| 2,701,068 | Douglas | Feb. 1, 1955 |

FOREIGN PATENTS

| | | |
|---|---|---|
| 372,416 | Germany | of 1923 |